(12) United States Patent
Yun et al.

(10) Patent No.: US 8,773,504 B2
(45) Date of Patent: Jul. 8, 2014

(54) STEREOSCOPIC CONTENT SERVICE SYSTEM AND METHOD

(75) Inventors: Kug Jin Yun, Daejeon (KR); Namho Hur, Daejeon (KR); Jin Woong Kim, Daejeon (KR); Soo In Lee, Daejeon (KR); Yoon-Jin Lee, Seoul (KR); Young-Kwon Lim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 910 days.

(21) Appl. No.: 12/809,401

(22) PCT Filed: Dec. 18, 2008

(86) PCT No.: PCT/KR2008/007511
§ 371 (c)(1),
(2), (4) Date: Dec. 15, 2011

(87) PCT Pub. No.: WO2009/078678
PCT Pub. Date: Jun. 25, 2009

(65) Prior Publication Data
US 2012/0098928 A1    Apr. 26, 2012

(30) Foreign Application Priority Data
Dec. 18, 2007    (KR) .................... 10-2007-0133202

(51) Int. Cl.
*H04N 13/04*    (2006.01)
*H04N 13/00*    (2006.01)

(52) U.S. Cl.
USPC ............................................ 348/43; 345/19

(58) Field of Classification Search
USPC ......................................................... 348/43
See application file for complete search history.

(56) References Cited

U.S. PATENT DOCUMENTS

| 6,215,825 | B1 * | 4/2001 | Melen ...................... 375/240.26 |
| 6,567,427 | B1 * | 5/2003 | Suzuki et al. ................. 370/535 |
| 6,593,936 | B1 * | 7/2003 | Huang et al. .................. 345/619 |
| 6,611,262 | B1 * | 8/2003 | Suzuki .......................... 345/419 |
| 7,636,088 | B2 * | 12/2009 | Nomura et al. ............... 345/419 |
| 8,111,906 | B2 * | 2/2012 | Song et al. .................... 382/154 |
| 8,508,582 | B2 * | 8/2013 | Newton et al. ................. 348/43 |
| 2003/0095177 | A1 * | 5/2003 | Yun et al. ....................... 348/42 |

(Continued)

FOREIGN PATENT DOCUMENTS

| KR | 2003-0056103 | 7/2003 |
| KR | 10-0556826 | 2/2006 |
| KR | 10-2006-0100347 | 9/2006 |
| KR | 10-2006-0130451 | 12/2006 |
| KR | 10-2007-0060951 | 6/2007 |

OTHER PUBLICATIONS

International Search Report and Written Opinion mailed Jul. 13, 2009 in corresponding International Application No. PCT/KR2008/007511.

*Primary Examiner* — Sath V Perungavoor
*Assistant Examiner* — Howard D Brown, Jr.
(74) *Attorney, Agent, or Firm* — Staas & Halsey LLP

(57) ABSTRACT

The present invention relates to a stereoscopic content service system and method, and more particularly to a stereoscopic content service system and method which defines a Scene Descriptor (SD) including information required for stereoscopic contents, displays the stereoscopic contents based on the information of the defined SD, and thereby may perform a two-dimension (2D)/three-dimension (3D) display conversion through user interaction and display a stereoscopic text based on information about a left and right text and disparity information.

13 Claims, 8 Drawing Sheets

(56) References Cited

U.S. PATENT DOCUMENTS

| | | | |
|---|---|---|---|
| 2003/0202089 A1* | 10/2003 | Alhadef et al. | 348/42 |
| 2007/0097208 A1* | 5/2007 | Takemoto et al. | 348/46 |
| 2009/0142041 A1* | 6/2009 | Nagasawa et al. | 386/124 |
| 2010/0215347 A1* | 8/2010 | Ikeda et al. | 386/108 |
| 2010/0272417 A1* | 10/2010 | Nagasawa et al. | 386/97 |

* cited by examiner

FIG. 1

```
ImageTexture{
  eventIn
  exposedField  SFBool
  field         MFString  url         []
  field         SFBool    repeatS     TRUE
                SFBool    repeatT     TRUE
}
```

FIG. 2

```
MovieTexture{
    eventIn
    exposedField    SFBool      loop                FALSE
    exposedField    SFBool      speed               1.0
    exposedField    SFFloat     startTime           0
    exposedField    SFTime      stopTime            0
    exposedField    SFTime      url                 []
    exposedField    MFString    repeatS             TRUE
    field           SFBool      repeatT             TRUE
    field           SFBool      duration_changed
    eventOut        SFTime      isActive
    eventOut        SFTime
}
```

FIG. 3

```
StereoscopicImageTexture{
    eventIn         SFBool      2D/3D_conversion    TRUE
    exposedField    MFString    main_url            [ ]
    exposedField    MFString    sub_url             [ ]
    field           SFBool      repeatS             TRUE
    field           SFBool      repeatT             TRUE
}
```

FIG. 4

| StereoscopicMovieTexture{ | | | |
|---|---|---|---|
| eventIn | SFBool | 2D/3D_conversion | TRUE |
| exposedField | SFBool | loop | FALSE |
| exposedField | SFFloat | speed | 1.0 |
| exposedField | SFTime | startTime | 0 |
| exposedField | SFTime | stopTime | 0 |
| exposedField | MFString | main_url | [ ] |
| exposedField | MFString | sub_url | [ ] |
| field | SFBool | repeatS | TRUE |
| field | SFBool | repeatT | TRUE |
| eventOut | SFTime | duration_changed | |
| eventOut | SFTime | isActive | |
| } | | | |

FIG. 5

```
StereoscopicText{
    exposedField    MFString    leftstring      []
    exposedField    MFString    rightstring     []
    exposedField    SFInt32     disparity       0
    exposedField    MFFloat     length          []
    exposedField    SFNode      fontStyle       Null
    exposedField    SFFloat     maxExtent       0.0
}
```

FIG. 6

```
StereoscopicText{
    exposedField    MFString    stereoscopicstring    []
    exposedField    SFInt32     disparity             0
    exposedField    MFFloat     length                []
    exposedField    SFNode      fontStyle             Null
    exposedField    SFFloat     maxExtent             0.0
}
```

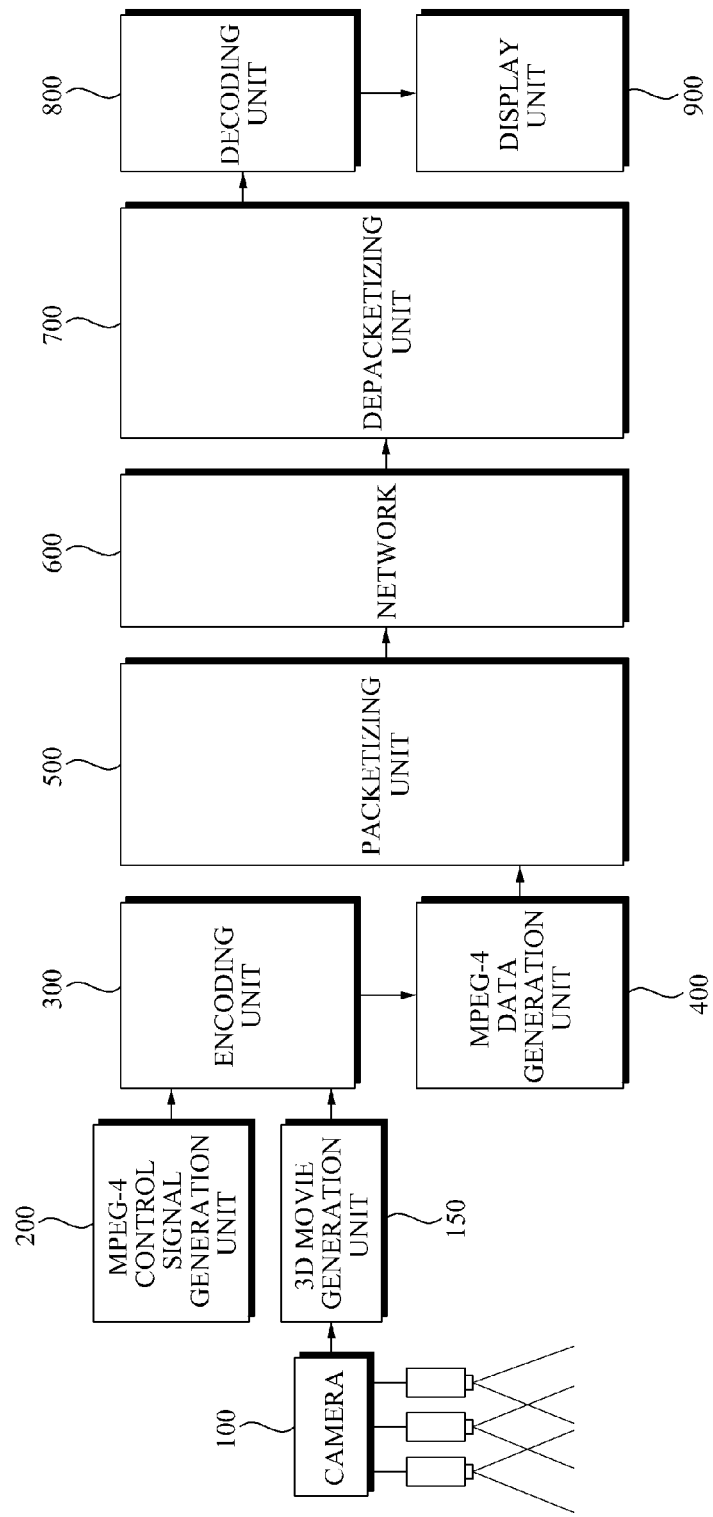

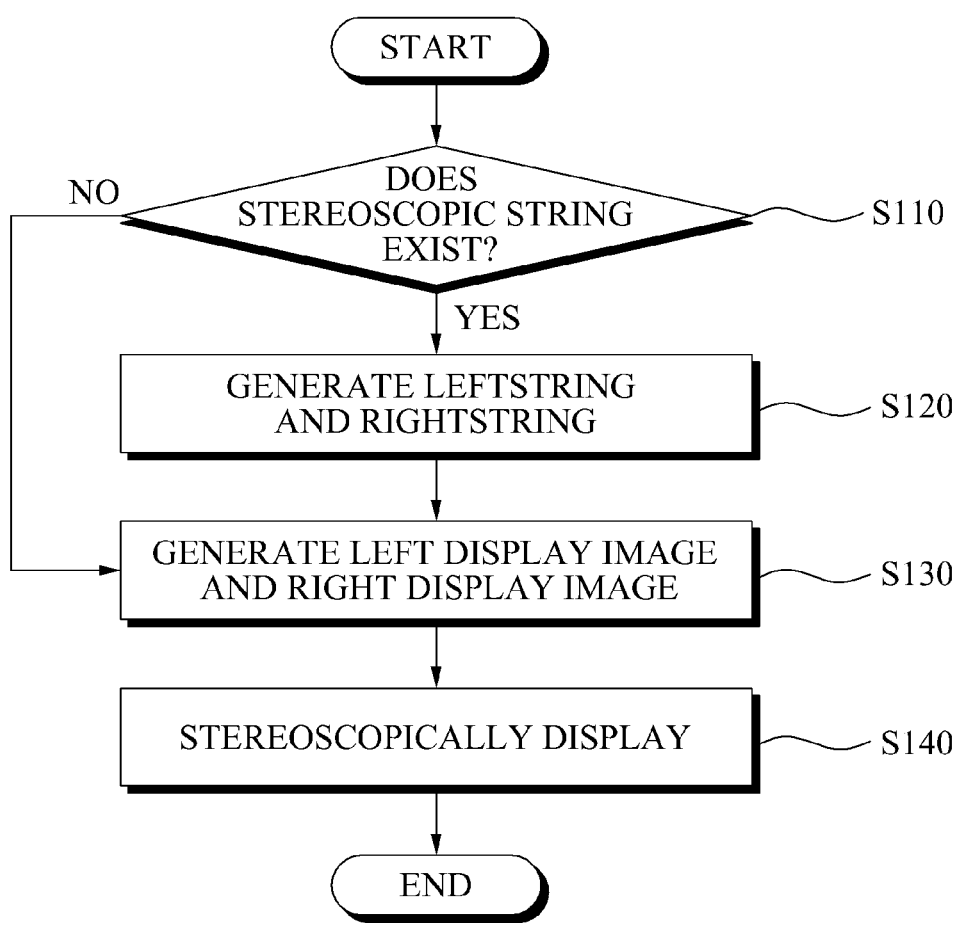

STEREOSCOPIC CONTENT SERVICE SYSTEM AND METHOD

CROSS REFERENCE TO RELATED APPLICATIONS

This application claims the benefit of International Application No. PCT/KR2008/007511, filed Dec. 18, 2008, and claims the benefit of Korean Application No. 10-2007-0133202, filed Dec. 18, 2007, the disclosures of all of which are incorporated herein by reference.

TECHNICAL FIELD

The present invention relates to a stereoscopic content service method and apparatus, and more particularly, to a stereoscopic content generation apparatus and method based on a Scene Descriptor (SD).

BACKGROUND ART

A three-dimensional (3D) image may represent reality of a real physical world, and have advantages of presence feeling, reality, naturalness, vividness, and the like.

Techniques for representing a 3D image may include a stereoscopic method and holographic method. The stereoscopic method uses a left side and a right side, that is, two two-dimensional (2D) images, and the holographic method uses diffusion of an object.

The holographic method aims to represent a 3D image more graphically using light diffused from an object. However, the holographic method in the present stage may not embody a 3D image in real time using current transmission systems due to a great amount of 3D information and a limit of related elements.

The stereoscopic method uses a principle of a human visual system (HVS). Specifically, humans perceive different images of an object from each eye due to a location difference of the left and right eye, and perceive the object in three dimensions, which is used in the stereoscopic method. That is, parallax associated with the fact that both eyes of human are apart from each other by approximately 65 mm is a critical point of cubic effect of human.

The stereoscopic method enables the left and right eye to each see different 2D images using a plurality of display devices, or enables different 2D images to be repeatedly displayed at regular intervals using a single display device. Accordingly, the stereoscopic method enables a user to synthesize two light sources reflected from an object, and thereby may create perspective and reality.

Thus, the stereoscopic method requires two 2D images different from each other.

In general, an Initial Object Descriptor (IOD), Scene Descriptor (SD), Object Descriptor (OD), and media data are required to create an image based on a Moving Picture Experts Group-4 (MPEG-4). An IOD is information to be first transmitted to compose an MPEG-4 scene, and defines a media profile and level. Also, an IOD includes an Elementary Stream (ES) descriptor about an SD stream and OD stream. An OD is a set of ES descriptors describing information about media data included in a scene, and provides information about a connection between an SD and ES of media data.

An SD is for embodying a real-time two-way video data service or interactive data broadcasting, and enables a two-way service interoperated with a program. Accordingly, SD is capable of interactive service according to users' needs.

In a conventional art, a technology to provide stereoscopic contents is disclosed in Korean Patent Unexamined Publication No. 10-2004-0090523 entitled 'System and Method of Internet Broadcasting for MPEG-4 based Stereoscopic Video'. In the patent, an Internet (Internet Protocol-based network) broadcasting system which provides an MPEG-4 based stereoscopic 3D movie service, and Video On Demand (VOD) and live service via Internet may be provided. The technology may enable a user to enjoy contents of a 2D or 3D image via the Internet.

The technology in a conventional art provides a receiving/transmitting system and storage format to provide a stereoscopic video service based on an MPEG-4 system. However, the technology in a conventional art may not perform a 2D/3D display mode conversion using an SD and provide a stereoscopic text, video, and still image. Accordingly, a technology to overcome such disadvantages is required.

DISCLOSURE OF INVENTION

Technical Goals

The present invention provides a stereoscopic content display method and apparatus which stereoscopically displays a text.

The present invention also provides a stereoscopic content generation method and apparatus which may directly display contents in a Scene Descriptor (SD) according to an image conversion request from a user without additional information conversion of a decoder, when the user requests a two-dimensional (2D)/three-dimensional (3D) display conversion.

The present invention also provides a stereoscopic content display method and apparatus for a scene description with respect to a stereoscopic video or still image.

Technical Solutions

According to an aspect of the present invention, there is provided a stereoscopic content generation apparatus, including: a Moving Picture Experts Group-4 (MPEG-4) control signal generation unit generating an MPEG-4 control signal including a Scene Descriptor (SD), wherein the SD includes stereoscopic text node information to stereoscopically display a text.

According to another aspect of the present invention, there is provided a stereoscopic content reproduction apparatus restoring MPEG-4 based stereoscopic content, including: a decoding unit decoding an MPEG-4 control signal including an SD from received MPEG-4 data, wherein the SD includes stereoscopic text information for stereoscopically displaying a text.

BRIEF DESCRIPTION OF DRAWINGS

FIG. 1 is a diagram illustrating a configuration of a movie node included in a Scene Descriptor (SD) of a general Moving Picture Experts Group-4 (MPEG-4);

FIG. 2 is a diagram illustrating a configuration of an image node included in an SD of a general MPEG-4;

FIG. 3 is a diagram illustrating a configuration of a stereoscopic movie texture node included in an SD according to an embodiment of the present invention;

FIG. 4 is a diagram illustrating a configuration of a stereoscopic image texture node included in an SD according to an embodiment of the present invention;

FIG. 5 is a diagram illustrating a configuration of a text node included in an SD according to an embodiment of the present invention;

FIG. 6 is a diagram illustrating a configuration of a text node included in an SD according to another embodiment of the present invention;

FIG. 7 is a block diagram illustrating a stereoscopic content service system according to an embodiment of the present invention; and FIG. 8 is a flowchart illustrating a stereoscopic content generation method with respect to a stereoscopic service according to an embodiment of the present invention.

BEST MODE FOR CARRYING OUT THE INVENTION

Hereinafter, embodiments of the present invention are described in detail by referring to the figures.

A Scene Descriptor (SD) is a technology standard indicating a spatial/temporal location and operation of a movie or audio object included in a scene, for example, which subtitle is included in a scene, how are pictures located, how often are pictures presented, and the like. The SD includes a movie texture node and image texture node. The movie texture node indicates scene information associated with a movie, and the image texture node includes scene information associated with a still image.

FIG. 1 is a diagram illustrating a configuration of a movie node included in a Scene Descriptor (SD) of a general Moving Picture Experts Group-4 (MPEG-4). FIG. 2 is a diagram illustrating a configuration of an image node included in an SD of a general MPEG-4.

In FIGS. 1 and 2, a 'url [ ]' field includes address information to designate an Object Descriptor (OD) of a corresponding movie or still image. A 'repeatS' field includes information about whether to horizontally segment a side of an object to apply an image to the side of the object. A 'repeatT' field includes information about whether to vertically segment a side of an object to apply an image to the side of the object.

Also, in FIG. 2, a 'loop' field includes information about whether to repeat. A 'speed' field includes information indicating a movie display speed represented as a rate. A value of 1.0 may represent a reference display speed of 100%. The movie display speed may increase as the value increases.

Also, a 'startTime' field includes information about a time to start operation, and a 'stopTime' field includes information about a time to stop operation.

In a conventional art, however, since each of the movie texture node and image texture node include only one 'url [ ]' field to designate the OD, stereoscopic contents generated by combining a main image and sub image may not be displayed. Also, a text may not be stereoscopically displayed using only the movie texture node and image texture node.

According to an embodiment of the present invention, a stereoscopic movie texture node, stereoscopic image texture node, and text node are provided. The stereoscopic movie texture node and stereoscopic image texture node may enable a 2D/3D conversion and enable stereoscopic contents to be easily displayed by adding a field to the movie texture node and image texture node. Also, the text node is for stereoscopically displaying a text.

FIG. 3 is a diagram illustrating a configuration of a stereoscopic movie texture node included in an SD according to an embodiment of the present invention. FIG. 4 is a diagram illustrating a configuration of a stereoscopic image texture node included in an SD according to an embodiment of the present invention.

As illustrated in FIGS. 3 and 4, the stereoscopic movie texture node and stereoscopic image texture node according to an embodiment of the present invention set two Uniform Resource Locater (URL) fields to designate an OD of a corresponding movie or still image. Specifically, a 'main_url [ ]' field and 'sub_url [ ]' field are set. The 'main_url [ ]' field includes address information of an OD of a main image and 'sub_url [ ]' field includes address information of an OD of a sub image belonging to the main image. Accordingly, two ODs may be simultaneously designated.

Also, a '2D/3D_conversion' code is combined with 'eventIn' where a node starts. The '2D/3D_conversion' code indicates a mode of an image to be displayed. When performing the node, a decoder may display the image in any one of 2D and 3D mode based on the '2D/3D_conversion'.

According to an embodiment of the present invention, when the '2D/3D_conversion' is FALSE, the image is set to be displayed in the 2D mode, and when the '2D/3D_conversion' is TRUE, the image is set to be displayed in the 3D mode. When the image is displayed in the 3D mode based on the '2D/3D_conversion', a corresponding 3D panel may be automatically turned on.

FIG. 5 is a diagram illustrating a configuration of a text node included in a SD according to an embodiment of the present invention. FIG. 6 is a diagram illustrating a configuration of a text node included in a SD according to another embodiment of the present invention.

In FIG. 5, a 'leftstring' field includes a first text corresponding to a left viewpoint, and a 'rightstring' field includes a second text corresponding to a right viewpoint. A 'disparity' field includes disparity information of the first text and second text.

The disparity information indicates information about an degree of horizontal shift of object of 3D movie or image. The dimensionality may change according to a change of the disparity information.

Also, a 'length' field includes length information of a text of the leftstring field and rightstring field. A 'fontStyle' field includes font style of the text, and a 'maxExtent' field includes information about a maximum range of storage space of the text.

In FIG. 6, a 'stereoscopic string' field includes a text to be stereoscopically displayed. The 'disparity' field indicates disparity information of the text.

The 'stereoscopic string' field is used when the text content of each of the left and right viewpoint is identical. The first text corresponding to the left viewpoint and second text corresponding to the right viewpoint are generated to be the same as the text of the 'stereoscopic string' field.

FIG. 7 is a block diagram illustrating a stereoscopic content service system according to an embodiment of the present invention.

As illustrated in FIG. 7, the stereoscopic content generation apparatus includes a camera 100, 3D movie generation unit 150, MPEG-4 control signal generation unit 200, encoding unit 300, MPEG-4 data generation unit 400, packetizing unit 500, network 600, depacketizing unit 700, decoding unit 800, and display unit 900. The camera 100 obtains and transmits a 3D movie. The 3D movie generation unit 150 preprocesses the 3D movie transmitted from the camera 100. The MPEG-4 control signal generation unit 200 generates an MPEG-4 OD and SD. The encoding unit 300 encodes an MPEG-4 control signal and 3D movie, inputted from the 3D movie generation unit 150 and MPEG-4 data generation unit 200, based on an MPEG-4 and existing encoding scheme. Also, the encoding unit 300 outputs an encoded stream. The MPEG-4 data generation unit 400 receives an MPEG-4 control signal with respect to media and media data of the encoded stream outputted from the encoding unit 300, and generates MPEG-4 data appropriate for an MPEG-4 standard. The packetizing unit 500 generates a packet appropriate for the MPEG-4 standard based on the generated MPEG-4 data. The network 600 transmits a packet generated in the packetizing unit 500. The depacketizing unit 700 receives the packet transmitted via the network 600 and restores the packet to the MPEG-4 data. The decoding unit 800 decodes the MPEG-4 data, restored in the depacketizing unit 700, and restores the 3D movie. The display unit 900 displays the restored 3D movie.

The camera 100 obtains 3D movie data including a main image and sub image, and transmits the 3D movie data to the 3D movie generation unit 150.

The 3D movie generation unit 150 performs preprocessing such as size and color change with respect to the 3D movie data transmitted from the camera 100. Also, the 3D movie generation unit 150 may output movie data of image file format such as BMP and YUV required from the encoding unit 300.

The MPEG-4 data generation unit 200 generates the OD and SD of the MPEG-4 control signal. The OD includes a relationship between each image and configuration information of a link. The SD includes stereoscopic movie texture node and stereoscopic image texture node, and text node. The stereoscopic movie texture node and stereoscopic image texture node include two URL fields and the '2D/3D_conversion' field. The two URL fields are 'main_url [ ]' and 'sub_url [ ]' as illustrated in FIGS. 3 and 4, and the '2D/3D_conversion' field indicates a mode of image to be displayed. The text node includes information to enable a text to be stereoscopically displayed as illustrated in FIG. 5.

The encoding unit 300 encodes the MPEG-4 control signal and 3D movie, transmitted from the 3D movie generation unit 150 and MPEG-4 data generation unit 200, based on an MPEG-4 and existing in another encoding scheme. Also, the encoding unit 300 outputs the encoded stream.

The MPEG-4 data generation unit 400 receives the encoded stream outputted from the encoding unit 300 and generates the MPEG-4 data defined in the MPEG-4 standard.

It is preferable that the MPEG-4 data generated in the MPEG-4 data generation unit 400 is an MPEG-4 file.

The packetizing unit 500 receives the MPEG-4 data generated in the MPEG-4 data generation unit 400 and generates the packet defined in the MPEG-4 standard based on the generated MPEG-4 data. Also, the packetizing unit 500 transmits the packet via the network 600.

The depacketizing unit 700 receives the packet transmitted via the network 600 and restores the packet to the MPEG-4 data. Also, the depacketizing unit 700 transmits the restored MPEG-4 data to the decoding unit 800.

The decoding unit 800 receives the MPEG-4 data, transmitted in the depacketizing unit 700, and restores the MPEG-4 control signal including the main image, sub image, OD and SD. Also, the decoding unit 800 generates a stereoscopic image based on the main image and sub image according to a display scheme selected by a user or client system environment.

The decoding unit 800 checks a '2D/3D_conversion' value in a stereoscopic movie texture node or stereoscopic image texture node of the SD included in the restored MPEG-4 control signal. When the '2D/3D_conversion' value is FALSE, the decoding unit 800 restores only 2D contents which is the main image, and transmits the 2D contents to the display unit 900. When the '2D/3D_conversion' value is TRUE, the decoding unit 800 generates a stereoscopic image by combining the main image and sub image, and transmits the stereoscopic image to the display unit 900. The stereoscopic image is a 3D image.

The decoding unit 800 generates the stereoscopic text image based on disparity information and text included in a stereoscopic text node of an OD, which is described in greater detail with reference to FIG. 8. The OD is included in the restored MPEG-4 control signal.

The display unit 900 displays the restored image to enable the user to enjoy the stereoscopic image. The display unit 900 provides a user interface for basic operation such as 'play', 'stop', 'pause', and the like.

The display unit 900 enables a left and right eye to see 2D image different from each other using a plurality of display devices, or enables the different 2D images to be repeatedly displayed at regular intervals using a single display device in order to generate the stereoscopic image.

FIG. 8 is a flowchart illustrating a stereoscopic content generation method with respect to a stereoscopic service according to an embodiment of the present invention.

In operation S110, it is determined whether a stereoscopic string exists in a stereoscopic text node of an initially transmitted OD.

When the stereoscopic string does not exist in the stereoscopic text node, a leftstring and rightstring exist. Accordingly, a left display image and right display image are generated based on a first text, second text, and disparity information in operation S130. The first text is included in the leftstring and the second text is included in the rightstring. Also, the left display image and right display image are transmitted to a display unit 900 in operation S130. The display unit 900 stereoscopically displays a text based on the left display image and right display image according to a display scheme selected by a user or client system environment in operation S140.

When the stereoscopic string exists in the stereoscopic text node, in operation S120, the leftstring and rightstring are generated, and a text included in the stereoscopic string field is stored in the leftstring and rightstring. Also, in operation S120, a first text and second text that have same content are generated. In operation S130, the left display image and right display image are generated based on the first text, second text, and disparity information, and transmitted to the display unit 900. The display unit 900 stereoscopically displays a text based on the left display image and right display image according to a display scheme selected by a user or client system environment in operation S140.

According to an embodiment of the present invention, an SD is provided with a stereoscopic text node including text information and disparity information of the text information, and thus a stereoscopic text may be supported using the SD.

Also, according to an embodiment of the present invention, an SD is provided with a stereoscopic video/image texture node including 2D/3D display mode conversion information, and thus a 2D/3D display mode may be converted using the SD.

Also, according to an embodiment of the present invention, an SD is provided with a stereoscopic video/image texture node including a main-url field and sub_url field, and thus a main OD and sub OD may be supported using the SD.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A stereoscopic content generation apparatus, comprising:
 a control signal generation unit generating a control signal including a Scene Descriptor (SD),
 wherein the SD includes at least one of stereoscopic movie texture node information to stereoscopically display a movie and stereoscopic image texture node information to stereoscopically display an image,
 wherein the stereoscopic movie texture node information further includes address information of a first Object Descriptor (OD) about a main movie of the movie and address information of a second OD about a sub movie belonging to the main movie,
 wherein the stereoscopic image texture node information further includes address information of a first OD about a main image of the image and address information of a second OD about a sub image belonging to the main image.

2. The stereoscopic content generation apparatus of claim 1, wherein the stereoscopic movie texture node information includes two-dimensional (2D)/three-dimensional (3D) information about whether to display the movie two-dimensionally or three-dimensionally.

3. The stereoscopic content generation apparatus of claim 1, wherein the stereoscopic image texture node information includes 2D/3D information about whether to display the image two-dimensionally or three-dimensionally.

4. The stereoscopic content generation apparatus according to claim 1, further comprising:
 an encoding unit encoding the control signal and 3D image including the main image and sub image, and outputting an encoded stream;
 a data generation unit receiving the encoded stream and generating data appropriate for a standard; and
 a packetizing unit receiving the data and generating a packet appropriate for the standard.

5. A stereoscopic content reproduction apparatus based stereoscopic content, comprising:
 a decoding unit restoring a main movie and a sub movie of a movie when encoded movie is received, or restoring a main image and a sub image of a image when encoded image is received; and
 a display unit displaying stereoscopically the movie or the image based on a scene Descriptor (SD)
 wherein the display unit displaying a main movie when the movie is not converted into a 3D movie based on a 2D/3D information, or displaying a stereoscopic content generated by combining the main movie and the sub movie when the movie is converted into a 3D movie based on a 2D/3D information included in the SD,
 wherein the display unit displaying a main image when the image is not converted into a 3D image based on a 2D/3D information, or displaying a stereoscopic content generated by combining the main image and the sub image when the image is converted into a 3D image based on a 2D/3D information included in the SD,
 wherein the SD includes at least one of stereoscopic movie texture node information for stereoscopically displaying the movie and stereoscopic image texture node information for stereoscopically displaying the image.

6. The stereoscopic content reproduction apparatus of claim 5, wherein the SD comprises:
 a first text corresponding to a left viewpoint;
 a second text corresponding to a right viewpoint; and
 information about disparity of the first text and second text.

7. The stereoscopic content reproduction apparatus of claim 5, wherein the SD includes text to be stereoscopically displayed and information about disparity of the text.

8. The stereoscopic content reproduction apparatus according to claim 5, further comprising:
 a display unit stereoscopically displaying the movie according to a display scheme selected by a user or client system environment based on the SD; and
 a display unit stereoscopically displaying the image according to a display scheme selected by a user or client system environment based on the SD.

9. The stereoscopic content reproduction apparatus of claim 5, wherein the SD includes 2D/3D information about whether to display the movie two-dimensionally or three-dimensionally.

10. The stereoscopic content reproduction apparatus of claim 5, wherein the decoding unit restores a main movie and sub movie from the data, transmits the main movie to the display unit when the movie is not converted into a 3D movie based on the 2D/3D information, and when the movie is converted into the 3D movie based on the 2D/3D information, combines the main movie and sub movie, generates stereoscopic content which is 3D content, and transmits the stereoscopic content to the display unit.

11. The stereoscopic content reproduction apparatus of claim 5, wherein the decoding unit restores a main image and sub image from the data, transmits the main image to the display unit when the image is not converted into a 3D image based on the 2D/3D information, and when the image is converted into the 3D image based on the 2D/3D information, combines the main image and sub image, generates stereoscopic content which is 3D content, and transmits the stereoscopic content to the display unit.

12. The stereoscopic content reproduction apparatus of claim 6, wherein the decoding unit generates a left display image and right display image based on the first text, second text, and information about disparity.

13. The stereoscopic content reproduction apparatus of claim 7, wherein the decoding unit generates a first text and second text based on the text, and generates a left display image and right display image based on the first text, second text, and information about disparity.

* * * * *